US008308168B2

(12) United States Patent
Nash

(10) Patent No.: US 8,308,168 B2
(45) Date of Patent: Nov. 13, 2012

(54) QUICK CHANGE TOOL BIT HOLDER

(75) Inventor: Derek J. Nash, Huntersville, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 844 days.

(21) Appl. No.: 12/394,667

(22) Filed: Feb. 27, 2009

(65) Prior Publication Data

US 2010/0219594 A1 Sep. 2, 2010

(51) Int. Cl.
*B23B 31/107* (2006.01)

(52) U.S. Cl. ............. 279/74; 279/82; 279/904; 279/155

(58) Field of Classification Search .................... 279/28, 279/29, 74, 75, 76, 79, 80, 904, 155, 82

See application file for complete search history.

(56) References Cited

U.S. PATENT DOCUMENTS 990,087 A 4/1911 Whitehead
1,138,465 A * 5/1915 fegley .............................. 279/82
1,538,670 A 5/1925 Stanley
1,857,012 A 5/1932 Corley
2,395,534 A * 2/1946 Cook .............................. 279/82
2,552,732 A 5/1951 Plante
3,767,217 A 10/1973 Jensen
3,795,406 A 3/1974 Rohm
4,087,195 A 5/1978 Wood
4,097,182 A 6/1978 Rolnick
4,215,871 A 8/1980 Hirsch et al.
4,266,789 A 5/1981 Wahl et al.
4,701,083 A * 10/1987 Deutschenbaur et al. .... 408/240
4,799,832 A 1/1989 Abbott
4,884,480 A 12/1989 Briese
5,000,631 A * 3/1991 Deutschenbaur et al. .... 408/240
5,470,084 A * 11/1995 Reibetanz et al. ........... 279/19.3
5,709,393 A * 1/1998 von Keudell et al. ........... 279/97

(Continued)

FOREIGN PATENT DOCUMENTS

EP 1375071 A2 1/2004

(Continued)

OTHER PUBLICATIONS

United Kingdom Intellectual Property Office, Examination Report for GB1003086.4, May 10, 2011.

(Continued)

*Primary Examiner* — Daniel Howell
*Assistant Examiner* — Paul M Janeski
(74) *Attorney, Agent, or Firm* — Dennis J. Williamson; Moore & Van Allen PLLC

(57) ABSTRACT

The quick change tool bit holder comprises a bore for receiving a bit. A retaining tooth, or plurality of teeth, is movable into engagement with the bit when the bit is inserted into the bore to retain the bit in the bore. An ejector ejects the bit from the bore when the retaining tooth is moved out of engagement with the bit. The ejector may comprise a spring that is compressed when the bit is inserted in the bore and a push button is biased by the spring into engagement with the bit. A sleeve forces the retaining tooth into engagement with the bit when said sleeve is in the locking position where the tooth moves at an angle relative to a longitudinal axis into contact with the bit. A method of operating the quick change tool bit holder is also disclosed.

19 Claims, 3 Drawing Sheets

U.S. PATENT DOCUMENTS

| | | | | |
|---|---|---|---|---|
| 5,873,580 | A | 2/1999 | Swenson, Sr. et al. | |
| 5,954,347 | A * | 9/1999 | Buck et al. | 279/20 |
| 6,053,675 | A * | 4/2000 | Holland et al. | 408/239 R |
| 6,062,574 | A | 5/2000 | Yorde | |
| 6,199,872 | B1 | 3/2001 | Hasan | |
| 6,261,035 | B1 * | 7/2001 | Moores et al. | 408/239 R |
| 6,474,656 | B1 * | 11/2002 | Thomas | 279/30 |
| 6,561,523 | B1 | 5/2003 | Wienhold | |
| 6,568,693 | B2 * | 5/2003 | Glass | 279/80 |
| 6,742,786 | B2 | 6/2004 | Casel et al. | |
| 6,860,489 | B2 * | 3/2005 | Chen | 279/82 |
| 6,863,280 | B2 * | 3/2005 | Chiu | 279/82 |
| 6,929,266 | B2 * | 8/2005 | Peters et al. | 279/82 |
| 6,997,654 | B2 | 2/2006 | Blick | |
| 7,086,813 | B1 * | 8/2006 | Boyle et al. | 408/239 R |
| 7,159,493 | B1 | 1/2007 | Huang | |
| 2004/0164503 | A1 * | 8/2004 | Fan-Chiang et al. | 279/75 |
| 2004/0217557 | A1 | 11/2004 | Wang | |
| 2006/0145431 | A1 * | 7/2006 | Chang | 279/74 |
| 2006/0232024 | A1 * | 10/2006 | Chu | 279/79 |

FOREIGN PATENT DOCUMENTS

WO 0166287 A2 9/2001

OTHER PUBLICATIONS

GB Intellectual Property Office, Combined Search and Examination Report, Jun. 28, 2010.

* cited by examiner

QUICK CHANGE TOOL BIT HOLDER

The invention relates generally to quick change holders and more particularly to a one-hand quick change holder.

BACKGROUND OF THE INVENTION

Tool bit holders are known that typically consist of a member that has one end that is retained in the chuck of a hand or powered rotary tool such as a drill, power driver, screw driver or other rotary tool. The other end of the member supports a bit holder that releasably holds a tool bit such as a screw driver bit, drill bit or the like. The tool bit holder is retained in the chuck of the rotary tool such that the bits can be quickly inserted into the holder without having to manipulate the chuck. Tool bit holders are known to use a ball to retain a quick change style bit in the holder. These tool bit holders require two-hand removal of the bit and only work with quick change style bits.

SUMMARY OF THE INVENTION

The quick change tool bit holder comprises a hub defining a bore for receiving a bit. At least one retaining tooth is movable into engagement with the bit when the bit is inserted into the bore to retain the bit in the bore. An ejector ejects the bit from the bore when the retaining tooth is moved out of engagement with the bit. The ejector may comprise a spring that is compressed when the bit is inserted in the bore that biases a push button into engagement with the bit. A spring biased sleeve forces the retaining tooth into engagement with the bit when the sleeve is in the locking position. The tooth moves into engagement with the bit at an angle relative to the longitudinal axis of the bit. A method of operating the quick change tool bit holder is also disclosed.

DETAILED DESCRIPTION OF PREFERRED EMBODIMENTS OF THE INVENTION

Figure 1:
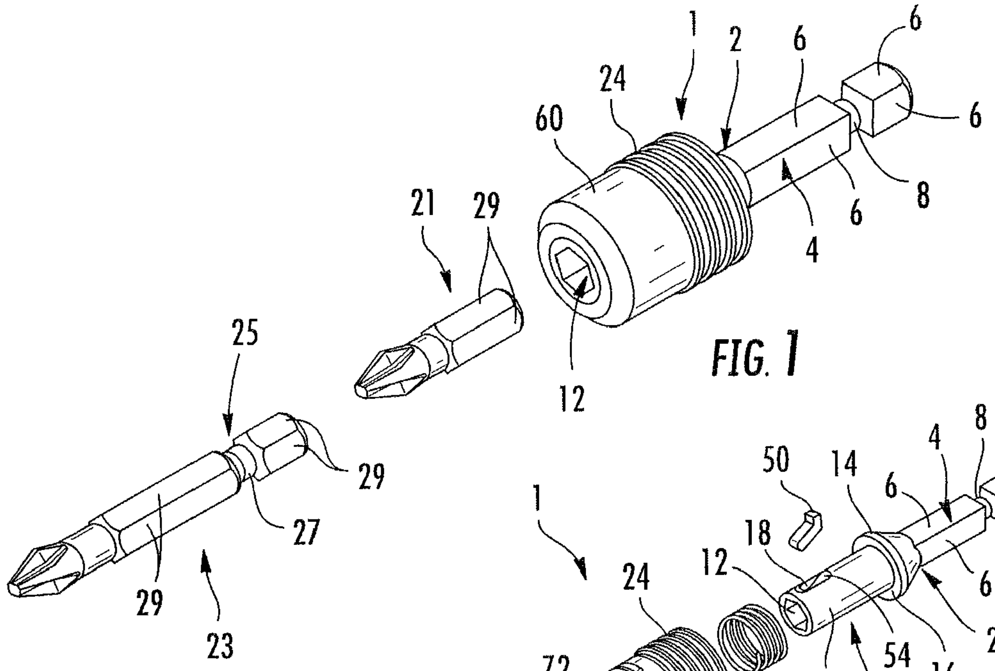
FIG. 1 is a perspective view of the quick change holder of the invention with exemplary tool bits.

Referring to the figures, the quick change holder of the invention 1 includes a central hub 2 having a shank 4 that is to be inserted into the chuck of a rotary tool such as a drill, screw driver, power driver or the like. The shank 4 has a plurality of flat faces 6 and an annular groove 8 that provide a quick change coupling with a standard chuck. Formed on the central hub 2 opposite to the shank 4 is a head 10 having an internal bore 12. The internal bore 12 comprises a first larger diameter bore 12*a* that opens to the end 46 of the head 10 opposite shank 4 and a second smaller diameter bore 12*b* that extends from the first bore 12*a* toward the shank 4. Larger diameter bore 12*a* may include a plurality of flat faces 13 that are coextensive with flat faces 29 on the tool bits to prevent relative rotation between the holder 1 and the tool bit. Typically, the faces 13 of bore 12*a* create a hex shaped bore. The bit is inserted into bore 12*a* along the longitudinal axis A-A with the longitudinal axis of the bit extending along the axis A-A.

Referring to FIG. 1, the tool bits may include insert type bits 21 or quick change style bits 23. Both the insert type bits 21 and the quick change style bits 23 may include a plurality of flat faces 29 formed on the shank that mate with the rotary tool to facilitate the mutual rotation of the tool and the bit. A quick change style bit typically includes a quick connect coupling 25 on the shank that is intended to be held by the chuck of a rotary tool. The quick connect coupling 25 typically includes an annular groove 27 located along the length of the bit. The insert bit 21 does not include a quick connect coupling such that the flat faces 29 extend uninterrupted for the length of the bit although some insert bits may have a groove in the corners of the hex so that it may be retained with a retaining ring. While the tool bits 21 and 23 shown in FIG. 1 comprise Phillips head screw drivers, the tool bits may include other driver configurations such as flat screw drivers, Allen wrench type drivers, socket drivers, or drill bits or other tools. The head 10 includes an annular flange 14 formed around the outer periphery thereof that defines a shoulder 16. An aperture 18 is formed in the wall 20 that forms bore 12 and communicates the exterior of head 10 with the larger diameter bore 12*a*.

A sleeve 24 fits over head 10 such that it can reciprocate along the longitudinal axis A-A of the central hub 2. Sleeve 24 includes an internal bore 26 through which the central hub 2 extends. The internal bore 26 has a diameter that closely but slideably fits over flange 14. Further, an annular flange 28 extends from the interior wall 30 of bore 26 to closely but slideably receive the exterior face 32 of wall 20. The sliding engagement of flange 14 with internal bore 26 and the sliding engagement of flange 28 with wall 20 constrains the movement of the sleeve 24 to linear movement along axis A-A.

Figure 3:
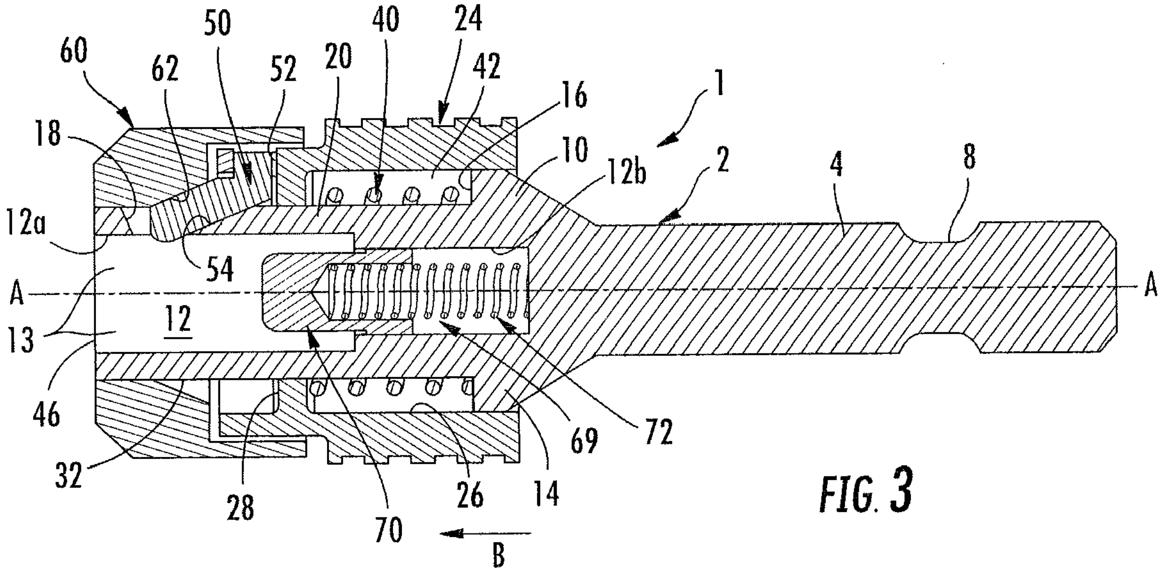
FIG. 3 is a longitudinal section view of the quick change holder of FIG. 1.

A compression spring 40 is located in the space 42 formed between the wall 20 and sleeve 24. The spring 40 engages shoulder 16 and flange 28 such that it biases the sleeve in the direction of arrow B to the locking position of FIG. 3. The sleeve 24 can be pushed toward shank 4 against the bias of spring 40 in the direction opposite to arrow B to an unlocking position. When the force is removed from sleeve 24, the sleeve is moved by spring 40 toward the end 46 of the central hub 2 to the locking position.

A retaining tooth 50 has one end loosely retained in aperture 52 formed on the sleeve 24. The opposite end of retaining tooth 50 extends into and through the aperture 18. Aperture 18 has camming surface 54 that is angled such that when the sleeve 24 is retracted in the direction opposite to arrow B the surface 54 moves retaining tooth 50 out of the large diameter bore 12*a*. Because the tooth 50 is loosely held in aperture 52, the tooth 50 can move slightly relative to the sleeve 24 to allow it to move out of the bore 12*a*. In the retracted position the retaining tooth 50 is flush with or slightly recessed from the internal surface of bore 12*a*. The bit is inserted into the bore 12*a* along the longitudinal axis A-A.

Each tooth has a generally L-shape including a first leg 51 connected to second leg 53. The first leg 51 is received in aperture 52 and the second leg 53 is received in aperture 18 and slides over camming surface 54.

A front collar 60 is fixed to the end of the central hub 4 to retain the sleeve 24 on the central hub. The collar 60 may be press fit onto the central hub or it may be secured by other attachment mechanisms such as welding, a mechanical fastener or the like. The front collar 60 has a camming surface 62 that extends over but spaced from the aperture 18. Camming surface 62 is arranged such that it forces retaining tooth 50 through aperture 18 and into bore 12*a*. The sleeve 24 forces the retaining tooth 50 into engagement with the bit when the sleeve is in the locking position. In one embodiment camming surface 62 is arranged substantially parallel to surface 54. The forward bias of the tooth 50 is guided downward into bore 12*a* by the angled camming surface 62 and the camming surface 54. The angled bias of the tooth 50 creates the force on the bit to hold the bit in the bore 12*a*. The surfaces 54 and 62 are arranged such that the tooth 50 is moved at an acute angle relative to the longitudinal axis A-A and the bit when the sleeve 24 forces the retaining tooth 50 into engagement with the bit.

Figure 2:
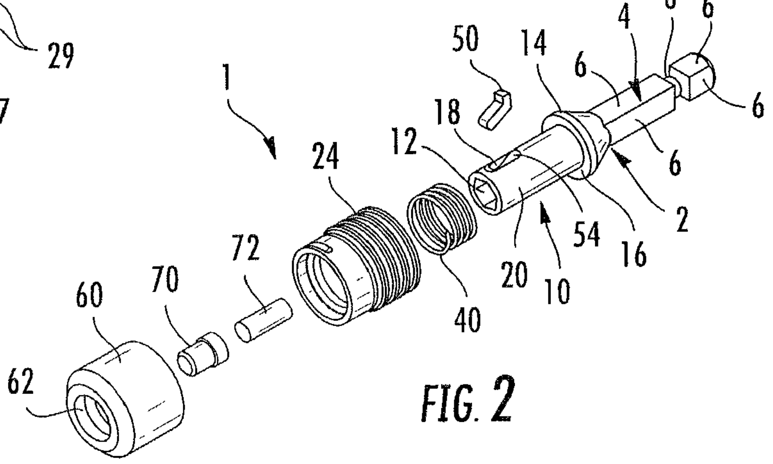
FIG. 2 is an exploded perspective view of the quick change holder of FIG. 1.

The small diameter bore 12*b* retains an ejector 69 in the form of a push button 70 that is closely but slideably received in the bore 12*b* such that it can reciprocate along axis A-A. A compression spring 72 is trapped between the push button 70 and the end of bore 12*b* such that it biases the push button 70 to the extended position shown in FIG. 2. When a bit is inserted into bore 12*a*, the bit overcomes the bias force of spring 72 to force push button 70 into the bore 12*b*, as shown in FIGS. 4 and 5.

Figure 4:
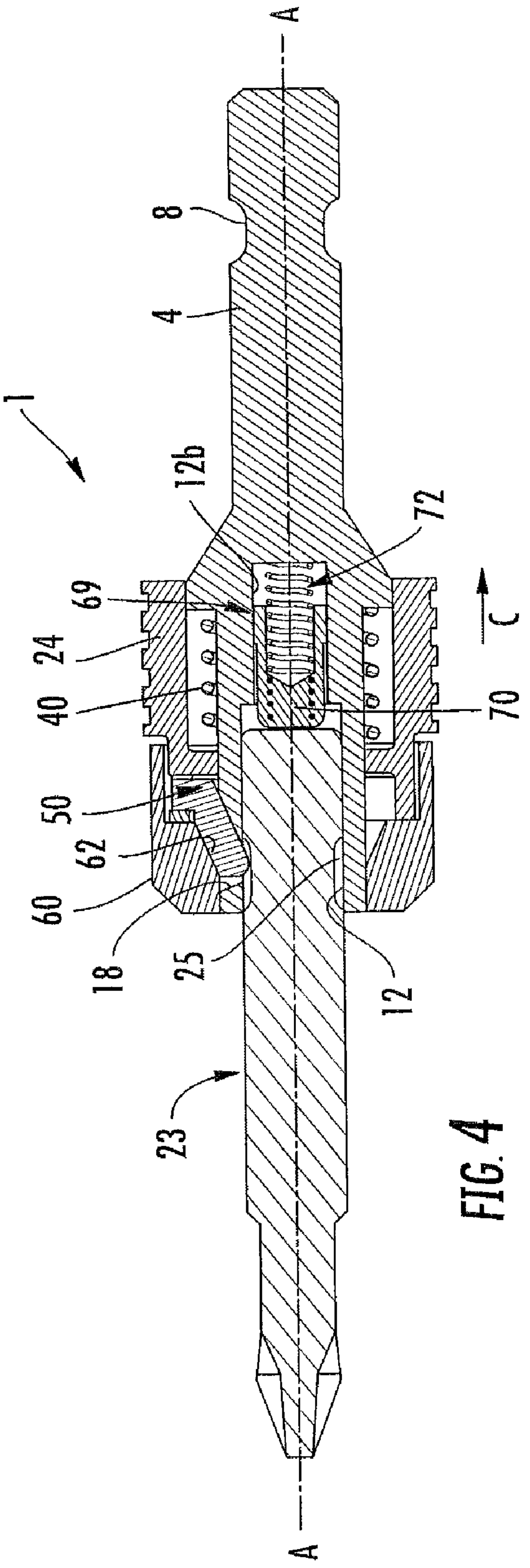
FIG. 4 is a longitudinal section view of the quick change holder of FIG. 1 holding a quick change style bit.

Referring to FIG. 4, to retain a quick change bit 23 in quick change holder 1 the bit is inserted into bore 12*a* along axis A-A until it contacts push button 70 and pushes against the front end 50*a* of the retaining teeth 50. The force exerted by the bit on the retaining tooth 50 pushes the tooth to move the sleeve 24 in the direction of arrow C to the unlocked position. As sleeve 24 is retracted, retaining tooth 50 is withdrawn from bore 12*a* such that it is flush with or retracted beyond the interior surface of bore 12*a*. When the tooth 50 is flush with the surface of bore 12*a* the bit will slide into the bore and compress spring 72 and force the push button 70 into bore 12*b*. When the drill bit 23 is fully inserted into bore 12*a*, spring 40 moves sleeve 24 opposite to arrow C to the locking position shown in FIG. 4. As the sleeve 24 moves to this position, the retaining tooth 50 is forced into engagement with the quick lock connector 25 on the end of the bit 23. Retaining tooth 50 moves at an acute angle relative to the longitudinal axis A-A and into engagement with the bit by camming surfaces 62 and surface 54.

To remove the bit, sleeve 24 is retracted against spring 40 in the direction of arrow C. As sleeve 24 retracts retaining tooth 50 is withdrawn from the bore 12*a*. Once the retaining tooth 50 is withdrawn from engagement with the quick connect coupler 25, spring 72 expands to force push button 70 against bit 23. Push button 70 ejects the bit 23 from the holder 1. Because the bit is ejected by simply retracting the sleeve 24, the quick change holder 1 can be operated by one hand to eject the bit. A magnet 80 may be located in the end of the push button as best shown in FIG. 5. The magnet 80 attracts the bit to hold it partially in bore 12*a* to prevent the bit from falling out of the bore during insertion and removal of the bit.

Figure 5:
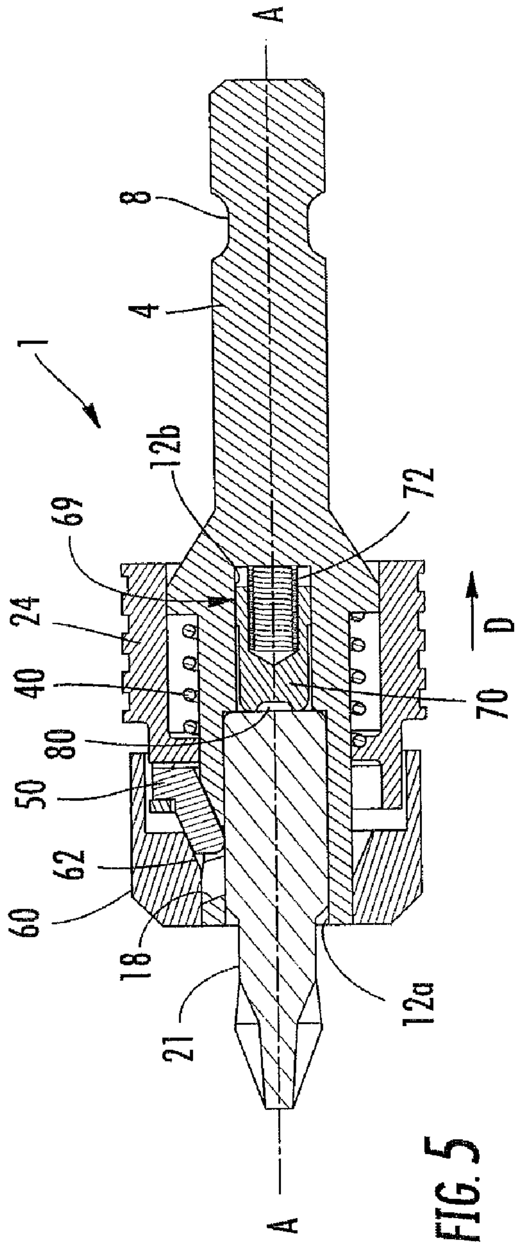
FIG. 5 is a longitudinal section view of the quick change holder of FIG. 1 holding an insert style bit.

Referring to FIG. 5, the quick change holder 1 operates in a similar manner to hold an insert bit 21. Insert bit 21 is inserted in bore 12 until it contacts push button 70 of ejector 69 and pushes against the front end 50*a* of the retaining teeth 50. The force exerted by the bit on the retaining teeth 50 pushes the teeth to move the sleeve 24 in the direction of arrow C to the unlocked position. As sleeve 24 is retracted, retaining tooth 50 is withdrawn from bore 12*a* such that it is flush with or retracted beyond the interior surface of bore 12*a*. Force is exerted on the bit in the direction arrow D to compress spring 72 and force the push button 70 into bore 12*b*. When the insert bit 21 is inserted into the bore 12*a*, spring 40 forces sleeve 24 to the locking position shown in FIG. 5. As the sleeve 24 moves to this position, the retaining tooth 50 is forced out of aperture 18 and into engagement with the side of the insert bit 21. Retaining tooth 50 moves at an acute angle relative to the longitudinal axis A-A and into engagement with the bit by camming surfaces 62 and surface 54. Because bit 21 does not include a quick connect coupling the retaining tooth 50 does not extend from aperture 18 into bore 12*a* as far as in the case of a quick change bit. Further, sleeve 24 does not move as close to collar 60 as with a quick connect bit.

To remove the bit 21, sleeve 24 is retracted against spring 40 withdrawing retaining tooth 50 from engagement with the bit 21. Once the retaining tooth is withdrawn from engagement with the side of the insert bit 21, spring 72 expands to force push button 70 against bit 21. Push button 70 ejects the bit 21 from the holder 1. Because the bit is ejected by simply retracting the sleeve 24, the quick change holder 1 can be operated by one hand to eject the bit. A magnet 80 may be located in the end of the push button as best shown in FIG. 5. The magnet 80 attracts the bit to hold it partially in bore 12*a* to prevent the bit from falling out of the bore during insertion and removal of the bit.

Figure 6:
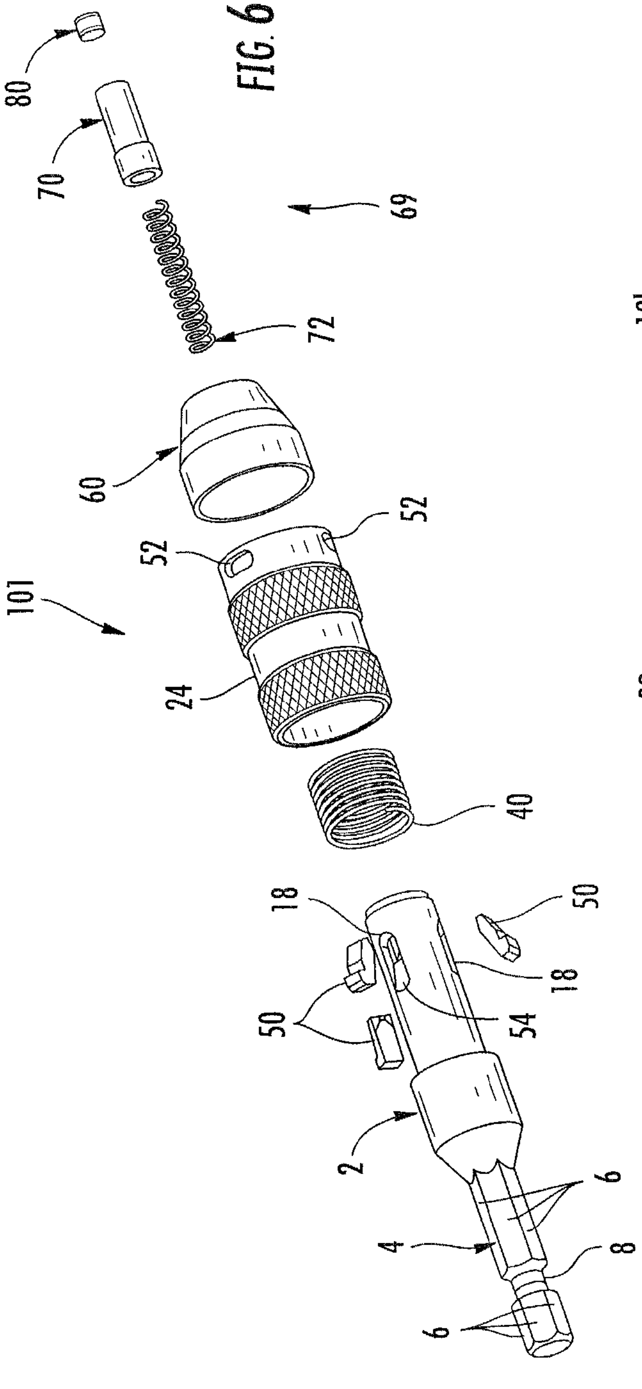
FIG. 6 is an exploded view of an alternate embodiment of the holder of the invention.
Figure 7:
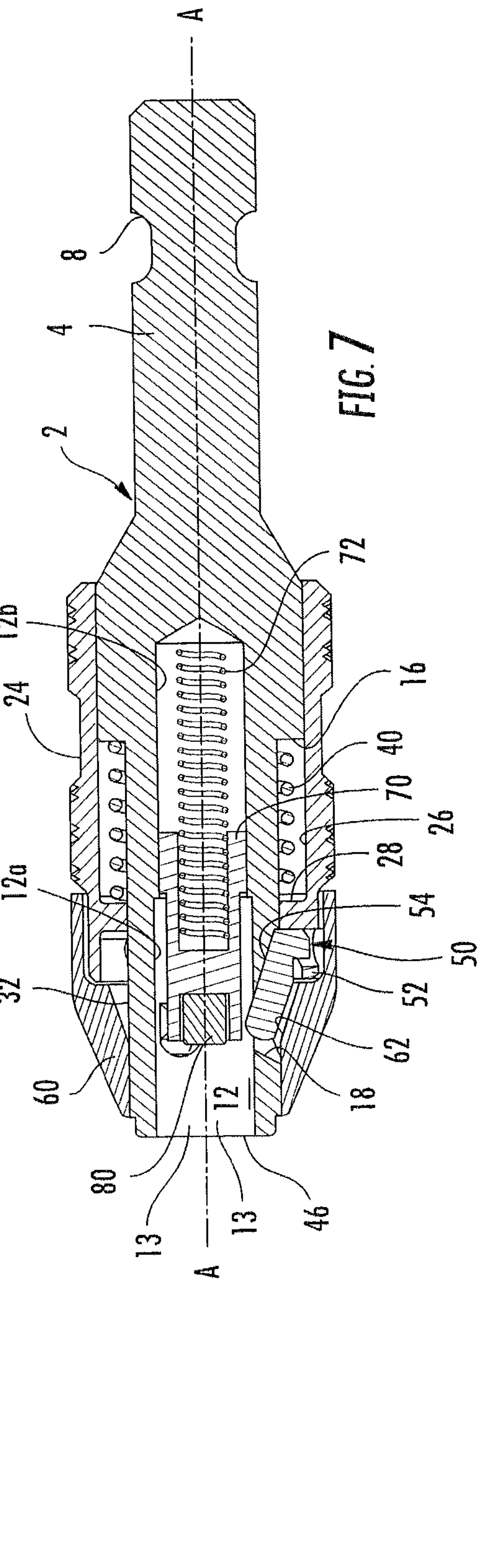
FIG. 7 is a longitudinal section view of the quick change holder of FIG. 6.

In the embodiment of FIGS. 1 through 5, one retaining tooth 50 is shown. More than one retaining tooth 50, and corresponding aperture 18 and camming surfaces 54 and 62, may be used if greater holding force is required. Referring to FIGS. 6 and 7 an alternate embodiment of the holder of the invention is shown where like reference numerals are used to identify like components previously described with reference to FIGS. 1 through 5. In the holder 101 three retaining teeth 50 are shown each tooth being loosely retained in apertures 52 formed on the sleeve 24. The opposite ends of retaining teeth 50 extend into and through the apertures 18. Apertures 18 have camming surfaces 54 that are angled such that when the sleeve 24 is retracted the surfaces 54 move retaining teeth 50 out of the large diameter bore 12*a*. Because the teeth 50 are loosely held in apertures 52, the teeth 50 can move slightly relative to the sleeve 24 to allow them to move out of the bore 12*a*. In the retracted position the retaining teeth 50 are flush with or slightly recessed from the internal surface of bore 12*a*.

Like the previous embodiment, a front collar 60 is fixed to the end of the central hub 4 to retain the sleeve 24 on the central hub 2. The collar 60 may be press fit onto the central hub or it may be secured by other attachment mechanisms such as welding, a mechanical fastener or the like. The front collar 60 has camming surfaces 62 that extend over but are spaced from the apertures 18. Camming surfaces 62 are arranged such that they force retaining teeth 50 through apertures 18 and into bore 12*a* to engage and hold the bits as previously described. The teeth 50 are evenly spaced around hub 4 such that they are arranged at approximately 120 degrees from one another such that the holding force is exerted relatively evenly around the bit. The embodiment of FIG. 6 includes the ejector 69 comprising push button 70, spring 72 and magnet 80 as previously described for ejecting the bit from the holder.

While embodiments of the invention are disclosed herein, various changes and modifications can be made without departing from the spirit and scope of the invention as set forth in the claims. One of ordinary skill in the art will recognize that the invention has other applications in other environments. Many embodiments are possible.

The invention claimed is:

1. A holder comprising:

a hub defining a bore for receiving a bit, wherein said bore has a longitudinal axis, the hub further defining at least one first aperture having a camming surface disposed at at least one acute angle relative to the longitudinal axis;

a sleeve mounted on the hub such that the sleeve reciprocates relative to the hub along the longitudinal axis, at least one second aperture formed in the sleeve that communicates with the at least one first aperture;

a plurality of retaining teeth movable into engagement with the bit when the bit is inserted into the bore, each of said plurality of retaining teeth comprising a first leg loosely received in the at least one first aperture and a second leg loosely received in the at least one second aperture such that each of the plurality of retaining teeth slides over the camming surface, said bit being inserted into said bore along said longitudinal axis, and said plurality of retaining teeth moving at the at least one acute angle relative to said longitudinal axis when said plurality of retaining teeth move into engagement with the bit.

2. The holder of claim 1 further including an ejector for ejecting the bit from the bore when the retaining tooth is moved out of engagement with said bit.

3. The holder of claim 1 wherein said hub includes a quick connect coupling at one end.

4. The holder of claim 2 wherein the ejector comprises a spring that is compressed when the bit is inserted in the bore.

5. The holder of claim 4 wherein the ejector further includes a push button biased by said spring into engagement with the bit.

6. The holder of claim 2 wherein the ejector is located in a second bore that is in communication with said bore.

7. The holder of claim 1 wherein said bore includes a plurality of flat faces.

8. The holder of claim 1 wherein said hub includes a shank opposite to said bore.

9. The holder of claim 1 wherein the sleeve is movable between a locking position and a retracted position.

10. The holder of claim 9 wherein said sleeve forces said retaining tooth into engagement with the bit when said sleeve is in said locking position.

11. The holder of claim 9 wherein said sleeve is biased toward said locking position.

12. The holder of claim 2 wherein said ejector includes a push button movable along said longitudinal axis and biased into said bore.

13. The holder of claim 12 wherein said push button includes a magnet.

14. The holder of claim 1 wherein said plurality of retaining teeth are spaced evenly about the periphery of the hub.

15. The holder of claim 1 wherein said plurality of retaining teeth include three teeth spaced at 120 degrees from one another about the periphery of the hub.

16. A method retaining an insert bit and a quick change bit in a tool comprising:

providing a hub defining a bore for receiving a bit, wherein said bore has a longitudinal axis, the hub further defining at least one first aperture having a camming surface disposed at at least one acute angle relative to the longitudinal axis;

a sleeve mounted on the hub such that the sleeve reciprocates relative to the hub along the longitudinal axis between a locking position and an unlocking position, at least one second aperture formed in the sleeve that communicates with the at least one first aperture;

a plurality of retaining teeth movable into engagement with the bit when the bit is inserted into the bore, each of said plurality of retaining teeth comprising a first leg loosely received in the at least one first aperture and a second leg loosely received in the at least one second aperture such that each of the plurality of retaining teeth slides over the camming surface;

inserting an insert bit or a quick change bit in the bore; and moving the plurality of retaining teeth into engagement with the bit when the bit is inserted into the bore by allowing the plurality of retaining teeth to slide over the camming surface at the at least one acute angle relative to the longitudinal axis.

17. The method of claim 16 retracting said sleeve and ejecting the insert bit or the quick change bit from the bore.

18. The method of claim 16 wherein the step of inserting the insert bit or the quick change bit includes compressing a spring.

19. The method of claim 18 wherein the step of retracting includes expanding the spring to eject the insert bit or the quick change bit.

* * * * *